July 19, 1949.      L. LINDELL      2,476,446
COLLAPSIBLE TUBE
Filed May 30, 1945

INVENTOR.
LEO LINDELL
BY *Irving Seidman*
ATTORNEY.

Patented July 19, 1949

2,476,446

UNITED STATES PATENT OFFICE 2,476,446

COLLAPSIBLE TUBE

Leo Lindell, Brooklyn, N. Y.

Application May 30, 1945, Serial No. 596,642

1 Claim. (Cl. 222—107)

This invention relates to improvements in collapsible tubes used for dispensing tooth paste, face creams and other creams, paints and the like.

Broadly, it is an object of my invention to provide a collapsible cellophane tube attached to a groove in the upper or neck portion of the tube.

A further object is to provide a simple and inexpensive method of attaching a cellophane or transparent plastic tubular member to a plastic or metal upper terminal member so that material within the tube would be readily visible and an efficient and tight joint is ensured capable of withstanding the force exerted when pressure is applied during use.

Another object of my invention is to provide means for attaching a collapsible plastic tubular member to a neck portion of a tube in a new, novel and inexpensive way.

Figure 1:
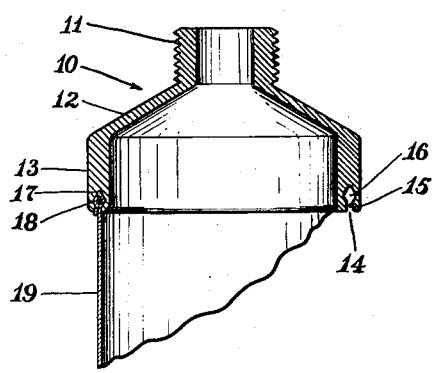
Figure 2:
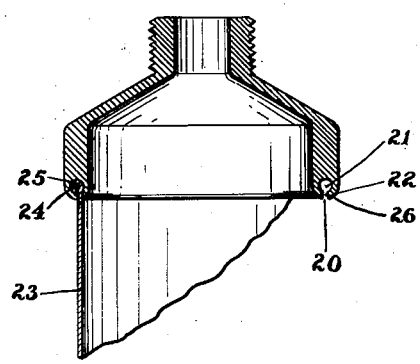
Figure 3:
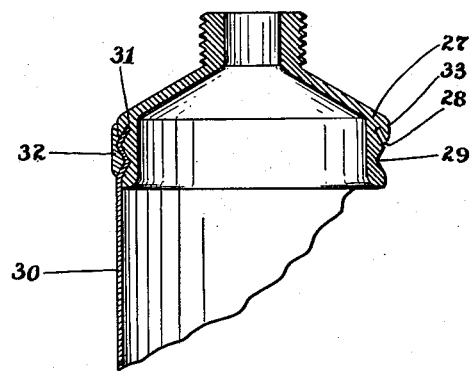

For a fuller understanding of the nature and objects of my invention reference is had to the following detailed description, in connection with the accompanying drawings, in which:

Fig. 1 is a vertical, sectional view of one form of my invention with part of the tube structure broken away, Fig. 2 is a vertical, sectional view of another form of my invention with part of the tube being broken away; and Fig. 3 is a vertical section view of another modified form of my invention with the lower portion of the tube being broken away.

Referring to Fig. 1 of the drawings, the dispensing terminal 10 comprises an exteriorly threaded neck 11 to receive a closure cap (not shown). The dispensing terminal 10 is preferably made of a plastic material to which pressure and heat can be applied in order to compress the material, or may be of a resilient plastic material. Of course, certain types of metal which are compressible or are resilient can also be used in place of the plastic material. The dispensing terminal 10 has an angular portion 12 and a depending shoulder or collar 13 in which there is a groove 14 in the lowermost portion, as shown in the figure. The groove 14 has a narrow neck or channel 15 and a diamond shaped larger opening 16 communicating with the narrow neck or channel 15. A transparent tube 19, preferably made of cellophane or other plastic material and of a diameter to fit within the groove 14 is provided, with its upper end 17 pressed into a diamond shape around a ring 18. A jig or fixture may be used to slightly spread the groove 14 to permit the upper diamond shaped portion 17 of the tube 19 to be inserted through the neck or channel portion 15 into the diamond shaped opening portion 16 of the dispensing terminal. Pressure is then applied to the lower portion of the collar 13 thus firmly housing the diamond shaped upper portion of the cellophane tube 19 within the groove 14. If a resilient material is used for the dispensing terminal, it will not be necessary to apply heat and pressure since the lower outside edge of the depending flange will spring back into its original position, thus tightly retaining the upper portion of the tube 19 within the groove 14. It is within the realm of my invention, in order to make a durable and leak-tight joint to spread a plastic adhesive within the groove 14 whenever a much stronger joint or union is required. It is also within the realm of my invention to eliminate the ring 18 and to insert the upper portion of the cellophane tube 19 with an adhesive within the groove 14.

Referring to Fig. 2, this modification is very much like the structure of Fig. 1, except that the groove 20 has a wide circular channel 21 communicating with the channel 22. The cellophane tube 23 is rolled at the upper portion with a ring 24 in the center of the rolled portion 25. The channel 20 may be slightly spread in order to receive and insert the rolled portion 25. After the rolled portion 25 is inserted within the circular channel 21, the lowermost flange 26 is compressed under heat and pressure in order to provide a leak-tight joint. For greater durability, an acetate or plastic adhesive can be inserted into the groove 20 before pressure is applied to the flange 26. Of course, it is possible to eliminate the ring 24 with satisfactory results.

Referring to Fig. 3 of the drawings, in this modification the side flange 27 has a groove 28 and a V-shaped channel 29 running around the dispensing terminal. The upper end 31 of a cellophane tube 30 is inserted within the groove 28 and a tension ring 32 slipped over the V-shaped groove 29 and the upper portion 33 of the side wall of the dispensing terminal as shown in the figure. This tension ring causes the upper wall of the cellophane tube to take the V-shaped formation of the groove 29 and seals the upper portion 33 firmly causing the cellophane tube 30 to be retained within the dispensing terminal. The slip ring 32 may be made of metal or of a resilient plastic. An adhesive, such as an acetate or other type of adhesive, may be spread into the grooves 28 and 29 and also between the upper portion of the cellophane tube and the slip or tension ring 32 providing a secure durable and leak-tight joint.

In all of the forms shown in Figs. 1 to 3, inclusive, the filling is done from the bottom of the cellophane tube which may be sealed in any well-known manner.

It is obvious that various modifications and changes may be made in the details of construction without departing from the general spirit of the invention.

I claim:

In a collapsible tube of the character described, comprising a dispensing terminal having a depending circular wall, an angular groove within said depending wall the opening of which is on the outside surface of said depending circular wall and a channel around the lower portion of said depending wall below said opening of said groove, a transparent plastic tube, the thickness of the upper portion of which fits within said angular groove, a tension slip ring having an inside ridge fitting around said depending wall and within said channel to firmly retain the upper portion of said plastic tube within said channel and within said groove, said slip ring being of such length as to grip the entire surface of the depending circular wall, including the portion which contains said angular groove, forming a durable leak-tight joint between said dispensing terminal and said plastic tube.

LEO LINDELL.

REFERENCES CITED

The following references are of record in the file of this patent:

UNITED STATES PATENTS

| Number | Name | Date |
| --- | --- | --- |
| 666,443 | Smith | Jan. 22, 1901 |
| Re. 18,433 | Barker | Apr. 19, 1932 |
| 1,913,839 | Lermer | June 13, 1933 |
| 1,921,021 | Bungay | Aug. 8, 1933 |
| 2,002,718 | Roselle | May 28, 1935 |
| 2,252,854 | Hubner et al. | Aug. 19, 1941 |
| 2,274,258 | Roselle | Feb. 24, 1942 |

FOREIGN PATENTS

| Number | Country | Date |
| --- | --- | --- |
| 838,036 | France | Feb. 24, 1939 |